(12) United States Patent
Nakatsuka et al.

(10) Patent No.: US 9,991,052 B2
(45) Date of Patent: Jun. 5, 2018

(54) BIAXIALLY STRETCHED POLYPROPYLENE FILM FOR CAPACITOR, METALLIZED FILM, AND FILM CAPACITOR

(75) Inventors: Takanori Nakatsuka, Tsuchiura (JP); Masami Sugata, Tsuchiura (JP); Tetsuya Asano, Tsuchiura (JP)

(73) Assignee: Toray Industries, Inc. (JP)

( * ) Notice: Subject to any disclaimer, the term of this patent is extended or adjusted under 35 U.S.C. 154(b) by 650 days.

(21) Appl. No.: 14/112,591

(22) PCT Filed: Apr. 19, 2011

(86) PCT No.: PCT/JP2011/059592
§ 371 (c)(1),
(2), (4) Date: Oct. 18, 2013

(87) PCT Pub. No.: WO2012/144015
PCT Pub. Date: Oct. 26, 2012

(65) Prior Publication Data
US 2014/0268493 A1    Sep. 18, 2014

(51) Int. Cl.
*H01G 4/18* (2006.01)
*C08J 5/18* (2006.01)
*B29C 55/14* (2006.01)
*B29K 23/00* (2006.01)
*B82Y 99/00* (2011.01)

(52) U.S. Cl.
CPC ............. *H01G 4/18* (2013.01); *B29C 55/143* (2013.01); *C08J 5/18* (2013.01); *B29K 2023/10* (2013.01); *B29K 2995/0072* (2013.01); *B82Y 99/00* (2013.01); *C08J 2323/10* (2013.01); *Y02T 10/7022* (2013.01); *Y10S 977/948* (2013.01); *Y10T 428/24355* (2015.01)

(58) Field of Classification Search
CPC ...... C08J 5/18; C08J 2323/10; C08J 2323/12; B29C 55/143; B29C 55/12; B29C 55/14; B29K 2023/10; B29K 2023/12
See application file for complete search history.

(56) References Cited

U.S. PATENT DOCUMENTS

| 4,916,198 A | 4/1990 | Scheve et al. | |
|---|---|---|---|
| 5,252,389 A * | 10/1993 | Schmidt | B29C 55/005 156/229 |
| 2009/0136714 A1* | 5/2009 | Itou | C08J 5/18 428/152 |

FOREIGN PATENT DOCUMENTS

| EP | 1 985 649 | 10/2008 |
|---|---|---|
| JP | 51-63500 | 6/1976 |
| JP | 62-121704 | 6/1987 |
| JP | 2869606 B2 | 1/1999 |
| JP | 2000-030973 A | 1/2000 |
| JP | 2001-072778 A | 3/2001 |
| JP | 2001-129944 A | 5/2001 |
| JP | 2001-324607 A | 11/2001 |
| JP | 3508515 B2 | 1/2004 |
| JP | 2006-066615 A | 3/2006 |
| JP | 2006-93688 | 4/2006 |
| JP | 2006-269726 A | 10/2006 |
| JP | 2007-290380 A | 11/2007 |
| JP | 2008-127460 | 6/2008 |
| JP | 2011-122142 A | 6/2011 |
| JP | 2011-122143 A | 6/2011 |

OTHER PUBLICATIONS

Bhushan, Surface Roughness Analysis and Measurement Techniques, Modern Tribology Handbook, CRC Press LLC, 2001.*
Leach, Bandwidth characteristics and comparisons of surface texture measuring instruments, Measurement Science and Technology 21 (2010) 032001.*
Montgomery, Challenges in the areal measurement of surface roughness and shape at the micro and nanoscale, 18th International School on Condensed Matter Physics, Journal of Physics: Conference Series 558 (2014) 012005.*
Misumi, Profile surface roughness measurement using metrological atomic force microscope and uncertainty evaluation, Measurement 73 (2015) 295-303.*
European Search Report dated Jan. 9, 2015 from corresponding European Patent Application No. 11863937.6.
Fujiyama, M., et al., "Study on rough-surface biaxially oriented polypropylene film, I. Formation of β-form crystals in sheet cast with T-die extruder," Journal of Applied Polymer Science, vol. 36, Issue 5, Aug. 20, 1998, pp. 985-993.
High Polymer Analysis Handbook, New Edition, edited by the Japan Society for Analytical Chemistry, Council for Analytical Research of High Polymer, 1995, pp. 609-611.
European Notice of Opposition dated Jan. 3, 2017, with Grounds of Opposition from corresponding European Application No. 11 863 937.6.

* cited by examiner

*Primary Examiner* — Monique Jackson
(74) *Attorney, Agent, or Firm* — DLA Piper LLP (US)

(57) ABSTRACT

Provided is a biaxially stretched polypropylene film for capacitors which has high withstand voltage characteristics when used as a dielectric for capacitors and which has highly suitable processability into elements. The biaxially stretched polypropylene film for capacitors has projections on both surfaces and has a thickness ($t_1$, μm) of 4-20 μm. When one of the surfaces is expressed by surface A and the other by surface B, all of the following relationships are satisfied. 800≤SRzB≤1,300 (nm) 0.1≤SRzA/SRzB≤0.8 PBmin≥100 (nm) PBmax≤1,500 (nm) 0.4≤PB450-750/PB≤0.7.

7 Claims, No Drawings

BIAXIALLY STRETCHED POLYPROPYLENE FILM FOR CAPACITOR, METALLIZED FILM, AND FILM CAPACITOR

TECHNICAL FIELD

The disclosure relates to a biaxially oriented polypropylene film suitable for packaging, industries and others, and in particular to a biaxially stretched polypropylene film for a capacitor which has, as a dielectric for capacitors, high withstand voltage characteristics and has highly suitable processability into elements.

BACKGROUND

Biaxially stretched polypropylene films are excellent in transparency, mechanical properties, electrical characteristics, and others to be used for various purposes/articles such as packaging purposes, tapes, and electrical purposes/articles, typical examples thereof including cable wrapping purposes, and capacitors.

With respect to the use for capacitors among such various uses, the films are particularly preferably utilized not only for direct current and AC capacitors but also for high-voltage capacitors because of their excellent withstand voltage characteristics, and low loss characteristics.

Recently, various electrical facilities have been made to have an inverter function. Following this tendency, capacitors have been increasingly required to be made smaller in size and larger in capacitance. In response to such requirements of the market, it is essential for the film to be made even more thinner while a biaxially stretched polypropylene film is improved in withstand voltage characteristics and processability into elements.

In such a biaxially stretched polypropylene film, the surfaces thereof need to be appropriately roughened from the standpoint of withstand voltage characteristics and processability into elements. This is particularly important for improving the slipping property or the oil impregnation property of the film and, when the film is made into a metallized capacitor, providing preservability. In the case of an oil-impregnated type capacitor in particularly, characteristics such as the withstand voltage characteristics and the preservability are significantly impaired when the capacitor is poor in impregnation property. Thus, it is important to roughen the surfaces appropriately. The preservability herein is a function of a metallized capacitor in which a metallized film formed on the dielectric film is used as an electrode, and is a function that the vapor-deposited metal is scattered by discharge energy when an abnormal discharge is caused, to cause the capacitor to recover electrical insulation, so that a short circuit is prevented to maintain functions of the capacitor or prevent the capacitor from being broken down. This function is very useful function also from the viewpoint of security.

Examples of the method for roughening the surfaces that have ever been proposed include mechanical methods such as an embossing method and a sandblasting method, chemical methods such as chemical etching using an solvent, a method of stretching a sheet in which a polymer different from polypropylene such as polyethylene is mixed, and a method of stretching a sheet in which β-crystals are formed (see, for example, JP 51-63500 A and JP 2001-324607 A).

However, the mechanical methods and chemical methods result in a low roughness density, and the method of stretching a sheet in which β-crystals are formed is likely to form bulky or coarse projections. Thus, the resultant sheet is not necessarily sufficient in terms of roughness density, coarse projection occurrence, and the number of projections. In a film with surfaces roughened by any of these methods, gaps between layers of the films tend to be not sufficiently impregnated with oil when the film is made into a capacitor. Thus, the capacitor partially may have a non-impregnated region with ease so that the lifespan of the capacitor may be shortened. The method of stretching a sheet in which a different polymer such as polyethylene is blended has a problem of being poor in recyclability. Specifically, although few bubbles are left when a capacitor is formed, the different polymer can adversely affect when the film is recycled.

The biaxially oriented polypropylene film based on any one of these methods is insufficient in preservability when a use condition of the capacitor is a severe condition that the electrical potential gradient used is 200 V/μm or more. Thus, a problem may be caused from the standpoint of reliability. The electrical potential gradient herein denotes a property obtained by dividing the voltage applied to the dielectric film by the thickness of the film, that is, the applied voltage per unit thickness of the film.

With respect to the roughness density and the uniformity of projections, suggested are: a high melt strength polypropylene film (see, for example, JP 2001-72778 A); a laminate obtained by laminating such a high melt strength polypropylene film onto an ordinary polypropylene film (see, for example, JP 2001-129944 A); and others. However, when high melt strength polypropylene resin itself is used for a capacitor, the capacitor cannot gain sufficient heat resistance and withstand voltage characteristics because of the structure of the resin. Thus, the capacitor has a problem of being remarkably lowered in dielectric breakdown voltage, particularly at high temperatures. Moreover, the above-mentioned technique of laminating a high melt strength polypropylene resin makes it very difficult to achieve a structure having a uniform laminate thickness. Thus, in the actual circumstances, the uniformity of the laminate is damaged so that a practically satisfactory dielectric film is not obtained. Japanese Patent No. 3508515 discloses a biaxially stretched polypropylene film the surfaces of which are controlled in roughness degree, and a method for producing the film. However, both the surfaces of the film are insufficiently controlled in roughness degree and such controlling is difficult.

It could be helpful to provide a biaxially stretched polypropylene film for a capacitor that exhibits excellent withstand voltage characteristics and reliability particularly when the film is used for a capacitor of AC voltage, and that ensures a stable processability into elements.

SUMMARY

We thus provide:

(1) A biaxially stretched polypropylene film for a capacitor, which has projections on both surfaces thereof, and has a thickness t1 (μm) of 4 to 20 μm, wherein when one of both the surfaces that is smaller in SRz is represented by a surface A and the other surface is represented by a surface B, all of the following expressions are satisfied:

$800 \leq SRzB \leq 1,300$ (nm), $0.1 \leq SRzA/SRzB \leq 0.8$, $PB\mathrm{min} \geq 100$ (nm), $PB\mathrm{max} \leq 1,500$ (nm), and $0.4 \leq PB450\text{-}750/PB \leq 0.7$, wherein:
SRzA: a ten-point average roughness (nm) of the surface A, SRzB: a ten-point average roughness (nm) of the surface B,
PBmin: a minimum projection height (nm) of the surface B,
PBmax: a maximum projection height (nm) of the surface B,
PB450-750: the number of projections which are present in the surface B and each have a height of 450 nm or more but less than 750 nm per 0.1 mm² (number/0.1-mm²), and
PB: the total number of projections present in the surface B per 0.1 mm² (number/0.1-mm²)

(2) The biaxially stretched polypropylene film for a capacitor according to item (1), wherein the following expression is satisfied:

$PB'≥250$ (number/0.1-mm²)

wherein:
PB': the total sum (number/0.1-mm²) of respective count values at slice values larger than a slice value at which a maximum count value is obtained in the surface B according to measurement by a non-contact three-dimensional microfigure measuring instrument.

(3) The biaxially stretched polypropylene film for a capacitor according to item (1) or (2), wherein all the following expressions are satisfied:

$400≤SRzA≤900$ (nm), $PAmin≥100$ (nm), and $PAmax≤1,000$ (nm), wherein:
PAmin: a minimum projection height (nm) of the surface A, and
PAmax: a maximum projection height (nm) of the surface A.

(4) The biaxially stretched polypropylene film for a capacitor according to any one of items (1) to (3), wherein PA and PB satisfy the following expression:

$|PA-PB|≥200$ (number/0.1-mm²), and

PA: the total number of projections present in the surface A per 0.1 mm² (numb er/0.1-mm²).

(5) The biaxially stretched polypropylene film for a capacitor according to any one of items (1) to (4), wherein all the following expressions are satisfied:

$20≤SRaA≤40$ (nm), and $30≤SRaB≤50$ (nm)

wherein:
SRaA: a central-line average roughness (nm) of the surface A, and
SRaB: a central-line average roughness (nm) of the surface B.

(6) The biaxially stretched polypropylene film for a capacitor according to any one of items (1) to (5), wherein when the central-line average roughness (nm) of the surface A is represented by SRaA (nm) and that of the surface B by SRaB (nm), at least one of values of SRzA/SRaA and SRzB/SRaB is from 20 to 35.

(7) The biaxially stretched polypropylene film for a capacitor according to any one of items (1) to (6), containing a branched polypropylene (H) in a proportion of 0.05 to 10.0% by mass.

(8) A metallized film, comprising the biaxially stretched polypropylene film for a capacitor which is recited in any one of items (1) to (7), and a metal film deposited over at least one surface of the polypropylene film.

(9) The metallized film according to item (8), wherein a surface electrical resistance of the metal film ranges from 1 to 20Ω/☐.

(10) A film capacitor, using the metallized film recited in item (8) or (9).

It is possible to provide a film having, on each of the front and rear surfaces thereof, excellent surface properties, thereby being suitably usable for an impregnated-type AC capacitor, and particularly, a biaxially stretched polypropylene film for a capacitor that is excellent in withstand voltage characteristics, preservability, and processability into elements.

DETAILED DESCRIPTION

Hereinafter, a description will be made in more detail about the biaxially stretched polypropylene film for a capacitor, the metallized film, and the film capacitor.

First, some technological background will be described.

To make a polypropylene film good in withstand voltage characteristics and processability into elements, it is important to control the surface roughness of each surface of the polypropylene film, the height of projections on the surfaces, and the number of the projections. To make a polypropylene film good in withstand voltage characteristics and processability into elements, important are also the uniformity of gaps between layers of the film, and slipperiness between the films or between the film and a feeding roll. When the film is made into an element, it is effective to decrease a local adhesion of the films onto each other and remaining stress. Individual indexes that will be described below are defined as indexes representing the film minimum thickness, gaps between film layers, and slipperiness thereof, which are closely related to the withstand voltage characteristics of a polypropylene film, and the processability thereof into capacitor elements. These indexes represent the form of surfaces of the film which cannot be represented by their conventional two-dimensional or three-dimensional central-line surface roughness, and which has not easily been realized. Particularly, the number density of projections each having a height in a predetermined range is defined, unlike the conventional roughness, thereby making it possible to yield a film having preferred processability into elements and preservability, and a high withstand voltage, particularly, a high withstand voltage for alternating current.

The biaxially stretched polypropylene film for a capacitor has projections on both surfaces thereof, and has a thickness t1 (μm) of 4 to 20 μm, wherein when one of both the surfaces that is smaller in SRz value is represented by a surface A and the other surface is represented by a surface B, all of the following expressions are satisfied:

$800≤SRzB≤1,300$ (nm), $0.1≤SRzA/SRzB≤0.8$, $PBmin≥100$ (nm), $PBmax≤1,500$ (nm), and $0.4≤PB450-750/PB≤0.7$, wherein:
SRzA: a ten-point average roughness (nm) of the surface A, SRzB: a ten-point average roughness (nm) of the surface B, PBmin: a minimum projection height (nm) of the surface B, PBmax: a maximum projection height (nm) of the surface B, PB450-750: the number of projections which are present in the surface B and each have a height of 450 nm or more but less than 750 nm per 0.1 mm$^2$ (number/0.1-mm$^2$), and PB: the total number of projections present in the surface B per 0.1 mm$^2$ (number/0.1-mm$^2$).

In the biaxially stretched polypropylene film for a capacitor, it is preferred, from the standpoint of the element size of the capacitor and the stability of the formation of the film, that the film thickness t1 according to the micrometer method is from 4 to 20 μm. The film thickness t1 according to the micrometer method is more preferably from 5 to 15 μm, particularly preferably from 6 to 12.0 μm. If the film thickness t1 is less than 4 μm, the film may be poor in mechanical strength or dielectric breakdown strength. If the film thickness t1 is more than 20 μm, the film is not easily formed as a film uniform in thickness. Additionally, when the film is used as a dielectric for a capacitor, the film becomes small in capacitance per unit volume. It is preferred to lay a metal film onto the surface A.

First, it is preferred that the ten-point average roughness SRzB of the surface B is from 800 to 1,300 nm. If the SRzB is less than 800 nm, there can be cases where the film cannot successfully wound because of insufficient air escape or the like so that the shape of the resultant roll is disordered and, as a result, the slitting step and capacitor element formation are not to be satisfactorily attained. If the SRzB is more than 1,300 nm, the dielectric breakdown voltage may be lowered. The SRzB is more preferably from 900 to 1,200 nm, even more preferably from 950 to 1,150 nm. From the same standpoint, the ten-point average roughness SRzA of the surface A is preferably from 400 to 900 nm, more preferably from 500 to 800 nm, even more preferably from 550 to 750 nm. When the SRzA and the SRzB are set into the preferred ranges, respectively, as described above, the film can be obtained as a film improved in windability and excellent in processability in the slitting step and the capacitor element step.

The ratio of the SRzA to the SRzB (SRzA/SRzB) ranges preferably from 0.1 to 0.8, more preferably from 0.3 to 0.7. If this value is less than 0.1, the respective projection heights on both the surfaces are too large in difference so that the film is easily deteriorated in withdraw voltage characteristics by effect of the projection difference. If the value is more than 0.8, the projection difference tends to be small so that the film is easily deteriorated in preservability. In particular, for high-voltage capacitors, the ratio is preferably limited into the above-mentioned range regardless of whether the capacitors are for direct current or alternating current and whether the capacitors are of an impregnated type or a non-impregnated type. When the film is made into a capacitor, this limitation makes it possible to improve the lifespan of the capacitor, and render the film excellent in electrical characteristics in terms of preservability and withstand voltage characteristics.

The film has, on both surfaces thereof, projections, respectively. When the minimum projection height of the surface B is represented by PBmin, the value thereof is preferably 100 nm or more, more preferably 200 nm or more. If the PBmin is less than 100 nm, the film cannot successfully wound because of insufficient air escape, and further the film is easily scratched when fed in the vapor deposition step, slitting step and capacitor element winding step. Thus, the film tends to have drawbacks. In particular, in the capacitor element winding step, the film is easily creased, and gaps between the layers are narrow so that a local adhesion of the layers onto each other is generated. Thus, the resultant capacitor is easily lowered in withstand voltage by electric field concentration thereinto. From such standpoints, the minimum projection height PAmin of the surface A is also preferably 100 nm or more, more preferably 150 nm or more.

When the maximum projection height of the surface B is represented by PBmax, the value thereof is preferably 1,500 nm or less, more preferably from 1,100 to 1,500 nm. If the PBmax is more than 1,500 nm, the film is easily deteriorated in dielectric breakdown resistance by coarse projections, and the minimum thickness is decreased so that withstand voltage characteristics are easily lowered. From the same standpoint, the maximum projection height PAmax of the surface A is preferably 1,000 nm or less, more preferably from 600 to 950 nm.

With respect to the projections present in the surface B, the total number thereof (per 0.1 mm$^2$) is represented by PB, and the number (per 0.1 mm$^2$) of projections each having a height of 450 nm or more but less than 750 nm is represented by PB450-750. In this case, the value of PB450-750/PB ranges preferably from 0.4 to 0.7, more preferably from 0.5 to 0.7. If the projections of the surface B do not satisfy the above-mentioned range, the film cannot successfully wound because of insufficient air escape, and further the film is easily scratched when fed in the vapor deposition step, slitting step and capacitor element winding step. Thus, the film tends to have drawbacks. In particular, in the capacitor element winding step, the film is easily creased, and gaps between the layers are narrow so that a local adhesion of the layers onto each other is generated. Thus, the resultant capacitor is easily lowered in withstand voltage by electric field concentration thereinto. Additionally, with respect to the impregnation performance as well, the film is poor in the uniformity of gaps between layers thereof, so that the film cannot be uniformly impregnated. Thus, a local corona discharge is generated so that the film is easily declined in withstand voltage characteristics. When PB' represents the total sum (number/0.1-mm$^2$) of respective count values at slice values larger than a slice value at which a maximum count value is obtained in the surface B according to measurement by a non-contact three-dimensional microfigure measuring instrument, the value of PB' is preferably 250/0.1-mm$^2$ or more, more preferably 300/0.1-mm$^2$ or more. When above-mentioned range is satisfied, it is shown that the proportion of the projections occupying the surface B is large. Thus, the film is further improved in processability into capacitor elements.

With respect to the projections present in the surface A, when the total number (per 0.1-mm$^2$) thereof is represented by PA, from the same standpoint as described above, the value of |PA−PB|, which shows a difference between the front and rear surfaces of the film, is preferably 200 or more, more preferably 250 or more. When above-mentioned range is satisfied, the film ensures self-healing property, and restrains corona discharge, thereby showing a more preferred property when used for a high-voltage capacitor.

In the biaxially stretched polypropylene film for a capacitor, the central-line average roughness of the surface A is represented by SRaA, and that of the surface B by SRaB. In this case, it is preferred that the SRaA ranges from 20 to 40 nm and the SRaB ranges from 30 to 50 nm. If the SRaA is more than 40 nm or the SRaB is more than 50 nm, the following is easily caused: when the films are laminated onto each other, air tends to enter gaps between layers thereof to deteriorate a capacitor element easily. Furthermore, when a metal layer is formed on the film, openings or the like tend to be made in the metal layer. At high temperatures, these defects tend to make the dielectric breakdown strength and the element lifespan decreased or, when a voltage is applied to the film, these defects tend to cause electrical insulation defects by the concentration of electric charges thereinto. On the contrary, if the SRaA is less than 20 nm or the SRaB is less than 30 nm, the film is deteriorated in slipping property to be poor in handleability. Additionally, when an insulating oil is impregnated into the capacitor element, the insulating oil does not penetrate uniformly into gaps between layers of the film. Thus, when the capacitor is continuously used, the capacitance tends to largely change. From this standpoint, the SRaA ranges more preferably from 25 to 35 nm. The SRaB ranges more preferably from 35 to 45 nm. Thus, it is possible to improve the film in windability in the capacitor element step and improve the capacitance change of a capacitor obtained when the film is processed. Thus, the film can be obtained as a film excellent in preservability and processability into elements, and processable into a capacitor excellent in electrical characteristics.

In the biaxially stretched polypropylene film for a capacitor, it is preferred that the central-line average roughness (SRa) and the ten-point average roughness (SRz) are in predetermined ranges. In other words, in at least one of the surfaces, the ratio of SRz/SRa (SRzA/SRaA or SRzB/SRaB) is set preferably to 20 to 35, more preferably 22 to 33, even more preferably 25 to 30. More preferably, in each of the surfaces A and B, this ratio satisfies the range.

If the ratio of SRz/SRa is more than 35 in each of the surfaces, the proportion of coarse projections increases. Thus, when the films are laminated onto each other, air tends to enter gaps between layers thereof to deteriorate a capacitor element easily. Furthermore, when a metal layer is formed on the film, openings or the like tend to be made in the metal layer. At high temperatures, these defects tend to make the dielectric breakdown strength and the element lifespan decreased. Additionally, when a voltage is applied to the film, these defects tend to cause electrical insulation defects by the concentration of electric charges thereinto. If the SRz/SRa ratio is less than 20, the film may be poor in handleability or in stability when fed.

A film that satisfies the above-mentioned definitions about the roughness and projections thereof is a film having characteristic surfaces excellent not only in surface uniformity but also in balance of the roughness density. When made into a capacitor, the biaxially stretched polypropylene film for a capacitor holds an appropriate clearance in any gap between layers of the film even when the capacitor undergoes dielectric breakdown. Accordingly, the capacitor has an excellent function of maintaining the capacitor lifespan (exhibiting the above-mentioned preservability stably) without being broken down.

The biaxially oriented polypropylene film preferably contains a branched polypropylene in a proportion of 0.05 to 10% by mass. The branched polypropylene (H) as used herein refers to a polypropylene having 5 or less tri-substituted internal olefins per 10,000 carbon atoms. The presence of the tri-substituted internal olefins can be confirmed by the proton ratio in the $^1$H-NMR spectrum.

When the film contains the branched polypropylene in a proportion of 0.05 to 10% by mass, the size of spherulites generated in the step of cooling a melt-extruded sheet of the resin can be more easily controlled to be made small, and the generation of electrical insulation defects generated in the step of stretching the film can be restrained to a small level. As a result, the polypropylene film excellent in withstand voltage characteristics can be obtained. Furthermore, while the branched polypropylene has an effect of an α crystal nucleating agent, this polymer makes it possible to form a rough surface on the basis of crystal modification as far as the addition amount thereof is in a predetermined range. Therefore, together with the above-mentioned effect of making the spherulite size small, a group of crater-shaped projections that will be later detailed can be made small in size, and can be compactly formed. Thus, this film can be provided as a biaxially stretched polypropylene film having excellent and characteristic surface roughness which gives an excellent projection uniformity and which does not permit coarse projections to be formed. The content of the branched polypropylene is more preferably from 0.05 to 7% by mass, more preferably from 0.05 to 3% by mass. When the content of the branched polypropylene is within the range, the film is improved in windability and withstand voltage characteristics and a film excellent in processability into elements and in capacitor characteristics can be obtained.

The method of forming the film surfaces described above will now be described.

As a representative method, the following can be adopted from the standpoint of no addition of electrical impurities, resulting in low possibility of deterioration in the electrical characteristics such as the dielectric breakdown voltage: a method that utilizes crystal modification to obtain target projections and surface roughness.

Surface morphologies obtained by crystal modification will now be described. A method of forming surfaces by crystal modification is a method as described in, for example, M. Fujiyama, Journal of Applied Polymer Science 36, pp. 985-1948 (1988), in which two crystal systems that polypropylene has are used to form a surface, and is a method of forming irregularities on the film surfaces by forming spherulites of α-crystal (monoclinic system, crystal density: 0.936 g/cm$^2$) system and spherulites of β-crystal (hexagonal system, crystal density: 0.922 g/cm$^2$) system on an unstretched sheet, and thereafter crystal-modifying the thermally unstable β-crystal into α-crystal in a stretching step. Since the basic unit of surface irregularities obtained by this method derives from the deformation of the spherulites, the surface shape can be composed of crater shapes formed elliptically or circularly by projection groups. The surface shape obtained by the crystal modification can be formed by the presence of a number of the crater shapes. The crater shapes may be formed by an elliptical or circular series of individual projections.

Furthermore, the technique is characterized in that in the area where no spherulites of β-crystal system exist, irregularities are not formed so that this area is relatively flat. The aforementioned crater-shaped projections change according to the ratio of longitudinal stretching to transverse stretching when the film is biaxially stretched. The shape thereof is substantially circular at a longitudinal/transverse ratio of 1, i.e., according to isotropic stretching, and flattens more with an increase in the longitudinal/transverse ratio. The shape obtained by sequential biaxial stretching usually has a long axis in the transverse direction of the film (the width direction of the film roll). Depending on the way spherulites are formed, such a shape that craters different from each other in shape overlap with each other may be created, and a bow-like or semi-arc shape that a circular arc is not closed into a ring form may be created.

As a method of forming the surface shape, a method of enhancing the film in nucleation ability by the addition of a material having a nucleating effect can be employed. By this method, a number of small fine projections are caused to exist by increasing the number of nuclei to reduce relatively flat areas (areas where no projections are present), whereby surface morphology in which projections are formed uniformly as a whole can be obtained. Such a surface is likely to satisfy the aforementioned surface shape because of compact formation of projections.

Examples of the material having a nucleating effect include the aforementioned branched polypropylene. The control of the addition amount of the branched polypropylene and conditions for the film formation allows control of the aforementioned crater shape, which in turn allows the formation of the aforementioned characteristic surface shape.

The biaxially stretched polypropylene film for a capacitor is preferably composed of a mixture of the branched polypropylene described above with a linear polypropylene. This allows an elevated melt crystallization temperature of 115° C. or higher in contrast to a melt crystallization temperature of usual polypropylene near about 110° C. In other words, when the melt crystallization temperature is high in a self-healing process of a capacitor, the capacitor is readily restored in preservability, and is improved in withstand voltage characteristics without being broken down. Specifically, by discharge energy generated when a dielectric film undergoes dielectric breakdown for some reasons, vapor-deposited metal near the discharging part is scattered or dispersed, and at this time, the film itself partially melts because the film partially rises in temperature. However, the film readily undergoes recrystallization soon, and is readily restored in insulation characteristics because the film is high in melt crystallization temperature. Usually, when the atmosphere temperature of a capacitor is elevated, its film is hardly recrystallized to be hardly restored in insulation characteristics. However, by elevating the melt crystallization temperature as described above, the film is readily recrystallized at high temperature when dielectric breakdown occurs. Thus, the capacitor is improved in preservability. Further, by controlling the surface roughness, for example, to roughen the surface and secure gaps between the film layers, the insulation characteristics are even better restored and the withstand voltage characteristics are even more improved.

Although the branched polypropylene is not particularly limited, from the standpoint of film-forming properties, the melt flow rate (MFR) is preferably 1 to 20 g/10-min, more preferably 1 to 10 g/10-min. The melt strength is preferably 1 to 30 cN and more preferably 2 to 20 cN. Then, the SRz-to-SRa (ten-point-average-roughness/central-line-average-roughness) ratio (SRz/SRa ratio) becomes large so that coarse projections are readily formed. As the melt strength increases, the projections tend to become higher in uniformity so that the ratio (SRz/SRa ratio) tends to become smaller. Thus, compact surfaces are easily attained (the number of the projections per unit area is large). If the melt strength is less than 1 cN, the uniformity of the projections is poor; whereas if the melt strength is 30 cN or higher, a preferred projection height cannot be retained.

To obtain the branched polypropylene, the following is preferably used: a method of blending oligomers or polymers having a branched structure, a method of introducing a long-chain branched structure into each polypropylene molecule as described in JP 62-121704 A; a method as described in Japanese Patent No. 2869606; or some other method. Specifically, examples of the resultant resin include resins "Profax PF-814" available from Basell and "Daploy HMS-PP" available from Borealis, among which a resin obtained by the electron beam crosslinking method is preferably used because the content by percentage of gel components in the resin is small. A feature shown when such a branched polypropylene is added to an ordinary linear polypropylene (PP) is that the melt crystallization temperature of the resultant rises to 115 to 130° C. although that of PP is usually around 110° C.

When a resin composition using such a branched polypropylene is adopted, at least two melting peak temperatures are observed in the film. Specifically, as melting peaks observed when the film is measured in the 2nd-Run, the film can have a shoulder peak temperature of 148 to 157° C. in addition to a first melting peak temperature of 160 to 172° C., whereby the film having uniform projections and having a compact surface shape with few coarse projections can be obtained. Further, when the film is made to have such a resin composition, the film can be produced as a biaxially stretched polypropylene film that has excellent uniform projections and an excellent surface shape with few coarse projections, and exhibits excellent processability and high withstand voltage characteristics even under atmospheric temperature conditions of −40° C. to over 80° C.

Next, the aforementioned linear polypropylene will be described. The polymer is generally used for packaging materials and a capacitor and, preferably, the cold xylene soluble fraction (hereinafter referred to as CXS) therein is preferably 4% or less by mass. The cold xylene soluble fraction (CXS) herein refers to polypropylene components dissolved in xylene after a sample is completely dissolved in xylene and then caused to precipitate at room temperature, and probably corresponds to components that are hard to crystallize because of a low tacticity, a low molecular weight thereof, and others. When such components are contained in the resin in large proportions, problems may arise such as a poor thermal dimensional stability of the film and a reduced dielectric breakdown voltage at a high temperature. Thus, the CXS is preferably 4% or less by mass, more preferably 3% or less by mass, and particularly preferably 2% or less by mass. It is preferred that the linear polypropylene used satisfies the aforementioned range, and it is also preferred that the whole of the film comprising this polymer as a constituent component satisfies the range.

To obtain a polymer or a polypropylene film having the CXS as described above, usable are a method of increasing, when obtaining the polymer, the catalytic activity, a method of washing a polymer obtained with a solvent or a propylene monomer itself, and other methods. From the same standpoint, the meso pentad fraction of the linear polypropylene is preferably 0.95 or more and more preferably 0.97 or more. The meso pentad fraction is an indicator of the tacticity of a crystal phase of polypropylene determined by the nuclear magnetic resonance method (NMR method). The higher the value is, the higher the crystallinity, the melting point and the dielectric breakdown voltage at a high temperature, which gives a preferred result. The upper limit of the meso pentad fraction is not particularly defined. Examples of the method for obtaining a polymer having such a high tacticity include a method of washing obtained resin powder with a solvent such as n-heptane, as mentioned above.

The linear polypropylene preferably has, from the standpoint of film-forming properties, a melt flow rate (MFR)

ranging more preferably from 1 to 10 g/10-min, particularly preferably from 2 to 7 g/10-min, more preferably from 2 to 5 g/10-min.

Although the linear polypropylene is mainly made of a homopolymer of propylene, it may contain, for example, a copolymerizable component of some other unsaturated hydrocarbon to the extent that the film is not impaired. Alternatively, the linear polypropylene may be blended with a polymer that is not made of propylene alone. Examples of such a copolymer component or the monomer component constituting a blend include ethylene, propylene (in the case of a copolymerized blend), 1-butene, 1-pentene, 3-methylpentene-1,3-methylbutene-1,1-hexene, 4-methylpentene-1, 5-ethylhexene-1,1-octene, 1-decene, 1-dodecene, vinylcyclohexene, styrene, allylbenzene, cyclopentene, norbornene, and 5-methyl-2-norbornene. In terms of dielectric breakdown withstand characteristics and dimensional stability, the copolymerization proportion or blend proportion is preferably less than 1 mol % for the copolymerization, and is preferably less than 10% by mass for the blend.

The linear polypropylene can also contain various additives such as a crystal nucleating agent, an antioxidant, a heat stabilizer, a glidant, an antistatic agent, an antiblocking agent, a filler, a viscosity modifier, a stain inhibitor, and others.

The selection of the type and content of the antioxidant among these additives may be preferable to improve the polypropylene in long-term heat resistance. In other words, the antioxidant is preferably phenolic one or ones having a steric hindrance, at least one of which is a high-molecular-weight antioxidant with a molecular weight of 500 or more. Specific examples thereof include various ones, and it is preferable to use, for example, 2,6-di-t-butyl-p-cresol (BHT: molecular weight 220.4) in combination with 1,3,5-trimethyl-2,4,6-tris(3,5-di-t-butyl-4-hydroxybenzyl)benzene (for example, Irganox (registered trademark) 1330 available from Nihon Ciba-Geigy K.K.: molecular weight 775.2), or tetrakis[methylene-3(3,5-di-t-butyl-4-hydroxyphenyl)propionate]methane (for example, Irganox 1010 available from Nihon Ciba-Geigy K.K.: molecular weight 1,177.7), or the like. The total content of the antioxidant(s) is preferably 0.03 to 1% by mass of the total amount of the polypropylene. When the amount of the antioxidant(s) is too small, the long-term heat resistance can be poor. When the amount of the antioxidant(s) is too large, blocking may be caused at a high temperature because of bleeding-out of the antioxidant(s), thereby affecting the capacitor element adversely. The content is more preferably 0.1 to 0.9% by mass and particularly preferably 0.2 to 0.8% by mass.

A crystal nucleating agent can be added to the extent that the film is not impaired. As mentioned above, the branched polypropylene per se has an α-crystal or β-crystal nucleating effect; it is also preferable to add, for example, another type of α-crystal nucleating agent (dibenzylidene sorbitol, sodium benzoate, or the like), or β-crystal nucleating agent (1,2-hydroxy potassium stearate, magnesium benzoate, an amide compound such as N,N'-dicyclohexyl-2,6-naphthalenedicarboxamide, a quinanacridone compound, or the like). However, the addition of the crystal nucleating agent may hardly give a desired surface roughness. By this matter, and others, the addition may have an adverse effect on the electrical characteristics such as a decline in the volume specific resistance at a high temperature. Thus, the content is preferably less than 0.1% by mass. More preferably, the agent be substantially not added.

The glossiness of the film surfaces is preferably 90 to 130% and more preferably 100 to 120%. Namely, to reduce the glossiness means that the light scattering density is increased on the film surfaces, i.e., that the irregularities on the film surfaces are made compact, and means an increase in the number of projections per unit area. However, if the glossiness is lowered to less than 90%, the film becomes good in liquid (oil) permeability. However, projections are formed compactly so that the number of the projections is increased. Thus, the amount of air between the projections is increased so that layers of the film readily slip on each other. As a result, the film tends to be deteriorated in windability into an element, making it difficult to be wound into a roll form. By contrast, if the glossiness is more than 130%, the layers of the film do not readily slip on each other so that the film is not easily shaped into a flat capacitor element, or some other inconvenience is caused. Thus, the clearance between the film layers cannot be sufficiently maintained so that the capacitor is deteriorated in preservability. This problem and other problems are caused. When the glossiness is in the aforementioned range, the film becomes good in windability into an element, breakdown voltage, and preservability.

The ash content of the biaxially stretched polypropylene film for a capacitor is preferably 50 ppm or less (on the basis of mass, the same shall apply hereinafter), more preferably 30 ppm or less, and particularly preferably 20 ppm or less. If the ash content is more than 50 ppm, dielectric breakdown withstand characteristics of the film decreases, so that when formed into a capacitor, dielectric breakdown strength can decrease. For the ash content to be in this range, it is important to use a low-catalyst-residue material. Usable therefor is, for example, a method of reducing contamination from an extrusion system during the formation of the film as much as possible, a method in which the bleeding time (the time for passing raw material through the extrusion system to wash the inside of its pipe before the formation of the film) is set to one hour or more.

The biaxially stretched polypropylene film for a capacitor is preferably used as a dielectric film for a capacitor, but the type of the capacitor is not particularly limited. Specifically, from the standpoint of electrode structure, the capacitor may be either of a foil-wound capacitor or a metallized film capacitor. The film is preferably used also for an oil-immersed capacitor impregnated with insulating oil, as well as a dry capacitor which does not use insulating oil at all. The film is especially useful particularly in an oil-immersed capacitor impregnated with insulating oil. From the standpoint of shape, the capacitor may be a wound capacitor or a stacked capacitor. The film is preferably used particularly as a metallized-film wound capacitor, among the above, from the standpoint of the characteristics of the film.

Polypropylene films generally have a low surface energy, so that it is difficult to stably deposit the vapor of a metal thereon. Thus, it is preferable to subject the film to a surface treatment in advance to make the film good in adhesive force to metal. Specific examples of the surface treatment include corona discharge treatment, plasma treatment, glow treatment, and flame treatment. Although a polypropylene film generally has a surface wetting tension of about 30 mN/m, such a surface treatment increases the wetting tension to about 37 to 50 mN/m, preferably, 39 to 48 mN/m, thereby rendering the film a film having excellent adhesiveness to a metal film and good preservability.

The biaxially stretched polypropylene film for a capacitor is obtained by biaxial stretching using materials that can provide the aforementioned characteristics. The film is obtainable by any biaxial stretching method out of inflation simultaneous biaxial stretching, stenter simultaneous biaxial stretching, and stenter sequential biaxial stretching. A film formed by the stenter sequential biaxial stretching, among these methods, is preferably used in terms of film-forming stability, thickness uniformity, and controlling of the surface shape of the film.

Next, the method of producing the biaxially stretched polypropylene film for a capacitor will now be described, but the method is not necessarily limited thereto.

First, a high-melt-strength polypropylene resin (branched polypropylene) is blended with a linear polypropylene, and the blend is melt-extruded and passed through a filtration filter. Thereafter, the blend is extruded out from a slit-form die at a temperature of 220 to 280° C. and solidified on a cooling drum to yield an unstretched sheet. To obtain the film, it is preferable to appropriately form β-crystal, and it is important to appropriately control the temperature of the cooling drum. To produce the β-crystal effectively, it is preferred to maintain, for a predetermined time, the blend at a resin temperature at which the production efficiency of the β crystal is maximum. Specifically, it is preferred to maintain the resin temperature from 115 to 135° C. for 1 second or longer.

To realize these conditions, the process may be appropriately determined in accordance with the resin temperature, the extrusion rate, the take-up speed and others. From the standpoint of productivity, the diameter of the cooling drum largely affects the maintaining period; thus, the diameter of the drum is preferably at least 1 m or more. Although the cooling drum temperature that should be selected is arbitrary to some extent because the temperature is affected by other factors as mentioned above, the temperature is preferably from 60 to 120° C., more preferably from 65 to 100° C., and particularly preferably 65 to 85° C. If the casting drum temperature is too high, there can be cases where crystallization of the film excessively proceeds and it is difficult to stretch the film in subsequent steps or voids are formed in the film to reduce the dielectric breakdown withstand characteristics. Alternatively, the film is made uneven in temperature by a decrease in the adhesion between the casting drum and the film, and other influences are likely to be produced. As a method of the adhesion thereof to the casting drum, any method may be used such as an electrostatic application method, an adhesion method utilizing the surface tension of water, an air knife method, a press roll method, or a submerged casting method. The air knife method, which provides good planarity and controllability of the surface roughness, is preferred.

Next, the unstretched film is biaxially stretched for biaxial orientation. First, the unstretched film is preheated through a plurality of rolls kept at 120 to 150° C. The preheating is performed to apply a larger amount of heat to the surface B by making the rolls different in temperature. The temperature of one or more rolls contacting the surface A is set into 120 to 140° C. while that of one or more rolls contacting the surface B into 130 to 150° C. to make the front and rear surfaces of the sheet different in temperature. While this temperature state is kept, the sheet is passed through the rolls, the peripheral speeds of which are made different from each other, to be stretched 2 to 6-fold in the longitudinal direction at a temperature of 130 to 150° C. The sheet is then cooled to room temperature. From the preheating step to the stretching step, important is the temperature state of the sheet surfaces. It is important to control the preheating to make the front and rear surfaces different from each other in film temperature. If the sheet is too thin, the front and rear surfaces are not readily made different in film temperature. The temperature of the preheating rolls and the contact time of the film need to have a proper relationship. Even when only the temperature is proper, the front and rear surfaces of the film sheet are not readily made different in temperature regardless of whether the preheating roll contact time is too short or too long. On the other hand, even if the roll contact time is proper, the difference between the front and rear surfaces is likewise not readily generated if the preheating temperature is improper. As conditions suitable for giving the difference to the front and rear surfaces, it is preferred to preheat the surface A for 30 to 40% of the preheating step time and preheat the surface B for 20 to 40% thereof. It is preferred to set the temperature conditions to make the surface temperature of the surface B 10 to 20° C. higher than that of the surface A during the preheating. Furthermore, in the case of using a radiation heater high in output power (heater output power: for example, 10.5 kW), the performance for controlling heat hysteresis is favorably improved.

In an appropriate example of the conditions, in a case where the total time of the preheating step is, for example, 11 seconds, an appropriate time allotment is as follows: the time during which the film sheet is in contact with the preheating rolls is 4 seconds for the surface A side and is 3 seconds for the surface B side (for the rest of the time, which is 4 seconds, the sheet does not in contact with any one of the rolls). In the preheating step in this case, a preferred film surface temperature is 110° C. for the surface A side and is 125° C. for the surface B side. When these conditions are satisfied, a target difference is obtained between the front and rear surfaces by the film temperature hysteresis of these surfaces. When the film is stretched in the longitudinal direction, it is also preferred to use a radiation heater for instantly raising the film temperature of the surface B side just before the stretching.

Subsequent to the stretching in the longitudinal direction, the stretched film is guided to a stenter to be stretched 5 to 15-fold in the width direction at a temperature of 150 to 170° C. Next, the film is heat set at a temperature of 140 to 170° C. while being subjected to 2 to 20% relaxation in the width direction. A surface of the film to be subjected to vapor deposition is then subjected to corona discharge treatment in the air, nitrogen or carbonic acid gas, or in a mixed gas thereof to make the surface to be metallized good in adhesiveness onto a deposited metal. In this way, a film is yielded. An example of the corona discharge treatment is a discharge treatment performed at an output power of about 10 to 20 kW.

It is preferable to lay a metal film onto at least one surface of the aforementioned biaxially stretched polypropylene film for a capacitor to obtain a metallized film. Although the method for laying the metal film is not particularly limited, it is preferred to use, for example, a method of vapor-depositing aluminum on least one of the surfaces of the polypropylene film to deposit to provide a metal film such as an aluminum-deposited film, which is to serve as an internal electrode of the film capacitor. In this method, for example, some other metal component such as nickel, copper, gold, silver, chromium, or zinc can also be vapor-deposited simultaneously or sequentially to the deposition of aluminum. Further, a protective layer may be laid onto the vapor-deposited film using, for example, oil.

The thickness of the metal film is preferably 20 to 100 nm in terms of electrical characteristics and the self-healing property of the film capacitor. For the same reason, the surface electrical resistance value of the metal film is preferably 1 to 20Ω/□. Metal species each have an inherent resistance value and besides the resistance value is inversely proportional to the film thickness. Thus, the surface electrical resistance value can be controlled by the metal species used and the film thickness.

After the formation of the metal film, the metallized film obtained can be aged at a specified temperature or heat-treated as required. Further, at least one of the surfaces of the metallized film can also be coated with polyphenylene oxide or the like for the purpose of insulation or the like.

One or more metallized films as obtained in such a way can be formed into a film capacitor by lamination or winding. A preferred example of the method of producing a wound film capacitor is described below.

First, aluminum is vacuum-deposited on one surface of a polypropylene film. In the deposition, aluminum is deposited in the form of stripes having margin parts extending in the longitudinal direction of the film. Next, each of the vapor-deposited parts and each of the margin parts of the surface are slit at their respective centers with a blade to be formed into tape-like take-up reels each having a margin at one side of its surface. In the tape-like take-up reels each having the margin on the right side or the left side, any one of the reels that has the right margin, and any one of the reels that has the left margin are put onto each other to protrude their vapor-deposited parts from their margins in the width direction, and then wound to obtain a wound roll. When both surfaces of the polypropylene are subjected to vapor deposition, the vapor deposition is performed onto one of the surfaces in the form of stripes having margin parts extending in the longitudinal direction. The vapor deposition is performed onto the other surface in the form of stripes to position their margin parts, which extend in the longitudinal direction, at respective centers of the vapor-deposited parts on the rear side thereof. Next, the respective centers of the margin parts of the front and rear surfaces are slit with a blade to form tape-like take-up reels each having, at its single side, a margin on each of the surface sides (for example, when the front surface has one of the on-surface-side margins at the right side, the rear surface has the other margin at the left side). Any one of the resultant reels, and a joinable film subjected to no vapor deposition are put onto each other to protrude the metallized film from the joinable film, and then wound to obtain a wound roll. The wound roll is pressed after the core is removed therefrom; metallikon is sprayed on both end faces thereof to form external electrodes; and lead wires are welded to the metallikon electrodes, whereby a wound capacitor element can be obtained. Film capacitors are used in various articles such as vehicles, household electric appliances (televisions, refrigerators, and the like), general noise suppression, automobiles (hybrid cars, power windows, wipers, and the like), and power sources. The metallized film can be suitably used in any one of them.

The method of measuring characteristic values and the method of evaluating effects will now be described.
(1) Film Thickness (μm)
The thickness of the film was measured by the micrometer method in accordance with JIS C-2330 (2001), 7.4.1.1.
(2) Gloss (Glossiness)
In accordance with JIS K-7105 (1981), a digital variable angle glossimeter UGV-5D manufactured by Suga Test Instrument Co., Ltd. is used to measure five points of the film under conditions that the incident angle is 60° and the light-receiving angle is 60°. The average of data thereon is defined as the glossiness.

(3) Melt Flow Rate (MFR)
The melt flow rate of the film is measured in accordance with JIS-K 7210 (1999) at a measurement temperature of 230° C. and a load of 21.18 N.
(4) Melting Point and Melt Crystallization Temperature (° C.)
A differential scanning calorimeter RDC220 manufactured by Seiko Instruments Inc. was used to measure the film under conditions described below.
Preparation of Sample
A specimen, 5 mg in weight, of the film is sealed into an aluminum pan for measurement. When metal vapor deposition or the like has been applied to the film, the applied matter was appropriately removed.
Measurement
The film is melted, recrystallized and re-melted in accordance with steps (a)→(b)→(c). The melting point of the resin was defined as the highest-temperature melting peak out of melting peaks observed in the 2nd Run. The average of measured values of three points of the film was calculated.
(a) 1st Run: 30° C.→280° C. (temperature-raising rate: 20° C./min)
(b) Tmc: the film is kept at 280° C. for 5 minutes and then cooled to 30° C. at 20° C./min
(c) 2nd Run: 30° C.→280° C. (temperature-raising rate: 20° C./min)
(5) Meso Pentad Fraction (Mmmm)
Meso pentad fraction (mmmm) is determined using $^{13}C$ NMR by dissolving the sample in a solvent under the following conditions (reference: High Polymer Analysis Handbook, New Edition, edited by The Japan Society for Analytical Chemistry, Council for Analytical Research of High Polymer, 1995, pp. 609 to 611).
  A. Measurement Conditions
    Apparatus: DRX-500 manufactured by Bruker
    Measurement nucleus: $^{13}C$ nucleus (resonance frequency: 125.8 MHz)
    Measurement concentration: 10 wt %
    Solvent: benzene/deuterated o-dichlorobenzene mixed solution at a mass ratio of 1:3
    Measurement temperature: 130° C.
    NMR sample tube: 5-mm tube
    Pulse width: 45° (4.5 μs)
    Pulse repetition time: 10 seconds
    The number of times of conversion: 10,000 times
    Measurement mode: complete decoupling
  B. Analysis Conditions
    Fourier transform is performed using an LB (line-broadening factor) of 1.0, and the mmmm peak is set to 21.86 ppm. A WINFIT software (available from Bruker) is used to split peaks. In the splitting, peak splitting is carried out as described below from higher-magnetic-field side peaks. Further, automatic fitting of the software is performed to optimize the peak splitting, and the total of peak fractions of mmmm and ss (spinning sideband peaks of mmmm) is defined as the meso pentad fraction (mmmm).
    The measurement is made five times, and the average value is determined.
  Peaks
    (a) mum
    (b), (c) rrrm (split into two peaks)
    (d) rrrr
    (e) mrmm+rmrr
    (f) mmrr
    (g) mmmr (h) ss (spinning sideband peaks of mmmm)
(i) mmmm
(j) rmmr (6) The Number of Tri-Substituted Internal Olefins The sample is dissolved in a solvent, and the number of tri-substituted internal olefins thereof is determined using $^1$H NMR under the following conditions:

A. Measurement Conditions
   Apparatus: ECX400P nuclear magnetic resonance apparatus manufactured by JEOL Ltd.
   Measurement nucleus: $^1$H nucleus (resonance frequency: 500 MHz)
   Measurement concentration: 2 wt %
   Solvent: deuterated o-dichlorobenzene
   Measurement temperature: 120° C.
   Pulse width: 45°
   Pulse repetition time: 7 seconds
   The number of times of conversion: 512 times
   Measurement mode: non decoupling B. Analysis Conditions
   On the basis of 7.10 ppm, which is the chemical shift of o-dichlorobenzene, a signal in the region from 5.0 to 5.2 ppm is assigned to the protons of tri-substituted internal olefins. The proton ratio of the tri-substituted internal olefins is determined from the integration ratio of the signal to a broad signal from 0.5 to 2.0 ppm.

(7) Cold Xylene Soluble Fraction (CXS)

Into 100 mL of boiled xylene is dissolved 0.5 g of the polypropylene film sample, and the solution is naturally cooled. The resultant is then subjected to recrystallization in a thermostat of 20° C. temperature for 1 hour, and then polypropylene based components dissolved in the filtrate are quantitatively determined (X (g)) by the liquid chromatographic method. A precisely measured value (X0 (g)) of the 0.5-g sample is used to calculate the CXS in accordance with the following equation:

$$\text{CXS}(\% \text{ by mass}) = (X/X0) \times 100.$$

(8) Central-Line Average Roughness (SRaA and SRaB), and Ten-Point Average Roughness (SRzA and SRzB)

The measurements were made in accordance with JIS B-0601 (1982) using "Noncontact Three-Dimensional Microfigure Measuring Instrument (ET-30HK)" and "Three-Dimensional Roughness Analyzer (MODEL SPA-11)" manufactured by Kosaka Laboratory Ltd. The measurement was repeated 10 times in the longitudinal direction. As the average thereof, the following were each obtained: the central-line average roughness (of SRa), the ten-point average roughness (of SRz), the projection heights, the numbers of the projections, and further the respective ratio therebetween (SRz/SRa ratio). In any one of the measurement operations, detailed conditions and data processing were as follows:

Minimum Projection Height (PAmin or PBmin), and Maximum Projection Height (PAmax or PBmax) (Unit: Nm)

Detection values detected by the measuring instrument are output, as a histogram, with intervals of 50 nm. For example, when projections of 200 nm or more and less than 250 nm are present as detection values, they are counted as a slice value (Z) in a column entitled 200 nm. The minimum projection height is the lower limit value of the slice width given by the slice value (Z) about which a count value is firstly output. In other words, when the slice value (Z) about which a count value is firstly output is in the column entitled 200 nm, the minimum projection height Pmin is 200 nm. Similarly, the maximum projection height is a slice value larger, by one, than the slice value (Z) about which a count value is finally output. In other words, when the slice value (Z) about which a count value is finally output is in a column entitled 1000 nm, the maximum projection height Pmax is 1050 nm. (In the case of the surface A, these heights are represented by PAmin and PAmax; and in the case of the surface B, these heights are represented by PBmin and PBmax).

The Total Number of Projections (PA, PB) (Unit: Number/0.1 Mm$^2$)

The total number of the projections represents the total sum of values each obtained by converting the number of projections detected at a sampling interval in the width direction and that in the length direction described in the item of measurement conditions into the number thereof per 0.1 mm$^2$ of the film.

Specifically, the total number of the projections is the total of the count values detected in the histogram obtained by the measuring instrument.

The Number of Projections Present on the Surface B Side and Each Having a Height of 450 Nm Or More but Less than 750 Nm (PB450-750)

With respect to the values on the surface B side of the histogram, the total number of detected projections satisfying the requirement of a height of 450 nm or more but less than 750 nm is represented. Specifically, this number is the total of count values in respective columns corresponding to slice values (Z) of 450, 500, 550, 600, 650 and 700 nm.

Total Sum (PB') of Respective Count Values at Slice Values Larger than the Slice Value at which Maximum Count Value is Obtained in the Surface B A slice value at which a maximum count value is obtained on the surface B side in the histogram is confirmed. The total sum of respective count values at slice values larger than the confirmed slice value (individual slice values larger by at least 50 nm than the slice value at which the maximum count value is obtained) is represented. Specifically, when the slice value at which a maximum count value of projections is obtained is 400 nm and the slice value at which projections are finally counted is 800 nm, individual slice values to be totally counted are 450, 500, 550, 600, 650, 700, 750 and 800 nm.

Measurement Conditions

Measuring surface treatment: aluminum is vacuum-deposited on a measuring surface.

Thus, a noncontact method was used.
Direction of measurement: film width direction
Feed rate in the width direction: 0.1 mm/sec
Measuring range (width direction×length direction): 1.0 mm×0.249 mm
Reference surface of elevation dimension: LOWER (lower side)
Sampling interval in the width direction: 2 μm
Sampling interval in the length direction: 10 μm
Sample number in the length direction: 25
Cutoff: 0.25 mm/sec
Magnification in the width direction: ×200
Magnification in the length direction: ×20,000
Wave, and roughness cut: None Measurement Method A dedicated sample holder is used to make the measurement. The sample holder is composed of two removable metal plates each having a circular hole at the center. A sample is fixed between the metal plates, and the film is stretched to the four sides of the sample holder to be fitted to the holder, and the area of the film corresponding to the central circular area was measured.

Measurement Results

An example of the measurement results obtained by the method described above is shown in Table 1. In the case of the data in Table 1, the readout of each parameter is as follows:

SRaA: 29.4 nm (rounded off to the first decimal places)
SRzA: 678 nm (rounded off to the nearest whole number)
SRaB: 48.9 nm (rounded off to the first decimal places)
SRzB: 1,225 nm (rounded off to the nearest whole number)
PAmin: 150 nm
PAmax: 750 nm
PA: $264/0.1\text{-mm}^2$ (rounded off to the nearest whole number)
PBmin: 300 nm
PBmax: 1,250 nm
PB450-750: $453/0.1\text{-mm}^2$ (rounded off to the nearest whole number)
PB: $749/0.1\text{-mm}^2$ (rounded off to the nearest whole number)
PB': $467/0.1\text{-mm}^2$ (rounded off to the nearest whole number)
|PA−PB|: $485/0.1\text{-mm}^2$.

(9) Original Film Characteristics (Dielectric Breakdown Voltage, and Original Film Slit Yield)

With respect to the dielectric breakdown voltage, the average of values thereof was calculated in accordance with JIS C 2330 (2001) 7.4.11.2 B method (plate electrode method). The resultant value was divided by the film thickness (μm) of the measured sample. The resultant value was represented with a unit of V/μm.

Slit products in which weaving or wrinkling was caused by slitting an original film were evaluated as unsatisfactory products, and the number ratio of the unsatisfactory products to the total products was expressed as a percentage and used as an index of processability (hereinafter referred to as original film slit yield). The original film slit yield is preferably as high as possible. When the yield was 95% or more, the original film was judged to be good "A"; when 90% or more and less than 95%, the original film to be "B"; and when less than 90%, the original film to be poor "C". A or B is at a practical level.

(10) Surface Electrical Resistance of Metal Film (Unit: Ω/□)

A metallized film was cut into rectangles having a length of 10 mm in the length direction and having the full width (50 mm) of this film in the width direction to prepare a sample. By the four-terminal method, the resistance of the metal film was measured throughout the range of a length of 30 mm in the width direction. The resultant measured value was multiplied by the measured width (10 mm), and then divided by the distance (30 mm) between the electrodes to calculate out the resistance of the film per area of 10 mm×10 mm.

(11) Processability into Elements in Capacitor Production (Element Winding Yield)

A vacuum-depositing machine manufactured by ULVAC, Inc. was used to vacuum-deposit aluminum onto one or two corona-treated surfaces of a polypropylene film yielded in each of Examples and Comparative Examples that will be described later to achieve a film resistance of 8Ω/sq.

In this case, for a film that has the corona-treated area only on its single surface among the resultant polypropylene films, aluminum was vapor-deposited in the form of stripes having margin parts extending to the longitudinal direction (vapor-deposited part width: 39.0 mm, and margin part width: 1.0 mm; a pattern of these widths was repeated).

Next, each of the vapor-deposited parts and each of the margin parts were then slit at their respective centers with a blade and formed into tape-like take-up reels each having a full width of 20 mm and each having a margin of 0.5 mm width at the left or right side. Any one of the left-margin reels and any one of the right-margin reels obtained were put onto each other such that the vapor-deposited parts were protruded from the margins in the width direction by 0.5 mm, and then wound to obtain a wound roll with an electrostatic capacitance of about 10 μF. The wound roll was pressed after the core was removed therefrom; metallikon was sprayed on both end faces thereof to form external electrodes; and lead wires were welded to the metallikon electrodes, whereby each wound capacitor element was obtained.

For a film that has the corona-treated area on each of the surfaces among the resultant polypropylene films, aluminum was vapor-deposited onto one of the surfaces in the form of stripes having margin parts extending in the longitudinal direction (vapor-deposited part width: 39.0 mm, and margin part width: 1.0 mm; a pattern of these widths was repeated). Aluminum was vapor-deposited onto the other surface in the form of stripes to position their margin parts, which extend in the longitudinal direction, at respective centers of the vapor-deposited parts on the rear side thereof (vapor-deposited part width: 39.0 mm, and margin part width: 1.0 mm; a pattern of these widths was repeated). Next, the respective centers of the margin parts of the front and rear surfaces were slit with a blade to form tape-like take-up reels having a full width of 20 mm and each having, at its single side, a 0.5 mm-width margin on each of the surface sides (for example, when the front surface has, at the right side, one of the margins 0.5 mm in width, the rear surface has, at the left side, the other margin 0.5 mm in width). Any one of the resultant reels, and a joinable film subjected to no vapor deposition were put onto each other to protrude the metallized film from the joinable film in the width direction, and then wound to obtain a wound roll with an electrostatic capacitance of about 10 μF. The wound roll was pressed after removing the core; metallikon was sprayed on both end faces to form external electrodes; and lead wires were welded to the metallikon electrodes, whereby each wound capacitor element can be obtained.

For the aforementioned winding of the element, a device KAW-4NHB manufactured by Kaido Mfg. Co., Ltd. was used. In this case, from the start of the winding to the end of the winding, the workpieces are each observed visually. Out of the observed workpieces, any workpiece in which weaving or wrinkling was caused was evaluated as an unsatisfactory workpiece. The number ratio of the unsatisfactory workpieces to the total workpieces was expressed as a percentage, and used as an index of processability (hereinafter referred to as element winding yield). The element winding yield is preferably as high as possible. When the yield is 95% or more, the original film is judged to be good "A"; when 80% or more and less than 95%, the original film to be "B"; and when less than 80%, the original film to be poor "C". A or B is at a practical level.

(12) Evaluation of Metallized Capacitor Characteristics

A vacuum-depositing machine manufactured by ULVAC, Inc. was used to vacuum-deposit an alloy metal of aluminum and zinc onto a film yielded in each of Examples and Comparative examples, which will be described later, in the form of stripes having margin parts extending in the longitudinal direction (vapor-deposited part width: 48.0 mm, and margin part width: 2.0 mm; a pattern of these widths was repeated) to achieve a film resistance of 8Ω/sq. In this way, each vapor-deposited reel of 50 mm width was obtained.

Next, the reel was used and wound into a capacitor element by an element winding machine (KAW-4NHB) manufactured by Kaido Mfg. Co., Ltd., and metallikon was applied thereto. In a vacuum, the workpiece was then thermally treated at a temperature of 105° C. for 10 hours. Lead wires were then fitted thereto to finish each capacitor element. In this case, the electrostatic capacitance of the capacitor element was 5 µF.

Ten of the thus obtained capacitor elements were used, and an AC voltage of 900 V was applied to each of the capacitor elements at normal temperature. After three minutes with the voltage being kept, the so-called step up test was made, in which a process of raising the applied voltage stepwise and gradually at 50 V/3-min was repeated. In the test, a point at which the current of the AC application instrument was suddenly changed was defined as a breakdown point. When the breakdown occurred after "t" seconds upon the application of "n" V, the breakdown voltage was calculated by the equation [n+50×t/180].

For example, when the breakdown occurred after 53 seconds upon the application of 950V:

$$950+50\times 53/180=965 \text{ V}.$$

The calculated voltage was divided by the film thickness to make withstand voltage evaluation.

After broken down, the capacitor was disassembled to examine the state of the breakdown. In this way, the element was evaluated in preservability as follows:

A: The element shows no change in shape, and no penetrating breakdown is observed.
B: The element shows no change in shape, and a penetrating breakdown is observed in 10 or less layers of a film observed.
C: The element shows changes in shape, or a penetrating breakdown over 10 layers thereof is observed.
D: The shape of the element is broken down.

Capacitors A can be used without any problem. Capacitors B can be used depending on the conditions. Capacitors C or D have a practical problem.

EXAMPLES

Our films and capacitors will be further described below by way of Examples.

Example 1

A branched polypropylene resin (high melt strength polypropylene: Profax PF-814) was blended into a polypropylene resin in which a polypropylene had a meso pentad fraction of 0.985 and a melt mass flow rate (MFR) of 2.6 g/10-min in a proportion of 0.5% by mass. The blend was supplied into an extruder at a temperature of 260° C., and then melt-extruded through a T-shaped slit die into a sheet form at a resin temperature of 255° C. The melted sheet was cooled and solidified on a cooling casting drum kept at 70° C. In this case, a time during which the film temperature was kept at 110 to 135° C. was 3.2 seconds.

Next, the sheet was preheated to set the surface A side thereof to 130° C. and set the surface B side (non-casting-drum-surface) thereof to 140° C. Subsequently, the sheet was passed between rolls kept at 148° C. and having different peripheral speeds to be stretched 4.6-fold in the longitudinal direction. At this time, the stretching was performed by supplementing calorie in a stretching zone using a radiation heater giving an output power of 10.5 kW. Subsequently, the film was guided to a tenter to be stretched 10-fold in the width direction at a temperature of 165° C. Next, the sheet was thermally treated at 155° C. while being subjected to 6% relaxation in the width direction. The sheet was then cooled to obtain a biaxially stretched polypropylene film having a film thickness of 7.0 µm. Further, one surface of the film was subjected to corona discharge treatment in the air at a treatment intensity of 20 W·min/m². For reference, it is preferred to subject a surface of the film that is smaller in SRz value to corona discharge treatment. The characteristics of the biaxially stretched polypropylene film thus obtained are as shown in Tables 2 to 4.

The dielectric breakdown voltage, and the processability into elements of the film obtained are also shown in Tables 2 to 4. Both of the withstand voltage, and the processability into elements were excellent.

Example 2

A film formation was carried out in the same manner as in Example 1 except that the casting drum temperature was set to 80° C. to obtain a biaxially stretched polypropylene film. The characteristics of the biaxially stretched polypropylene film obtained are shown in Tables 2 to 4.

Example 3

A film formation was carried out in the same manner as in Example 1 except that the casting drum temperature was set to 65° C. to obtain a biaxially stretched polypropylene film. The characteristics of the biaxially stretched polypropylene film obtained are shown in Tables 2 to 4.

Example 4

A film formation was carried out in the same manner as in Example 1 except that the surface A preheating temperature before stretching was set to 135° C., the surface B preheating temperature before stretching to 135° C., and a temperature at which the sheet was stretched 4.6-fold in the longitudinal direction to 140° C. to obtain a biaxially stretched polypropylene film. The characteristics of the biaxially stretched polypropylene film obtained are shown in Tables 2 to 4.

Example 5

A film formation was carried out in the same manner as in Example 1 except that the biaxially stretched polypropylene film thickness was set to 6.5 µm to obtain a biaxially stretched polypropylene film. The characteristics of the biaxially stretched polypropylene film obtained are shown in Tables 2 to 4.

Example 6

A film formation was carried out in the same manner as in Example 1 except that the biaxially stretched polypropylene film thickness was set to 6.5 µm, and the casting drum temperature to 80° C. to obtain a biaxially stretched polypropylene film. The characteristics of the biaxially stretched polypropylene film obtained are shown in Tables 2 to 4.

Example 7

A film formation was carried out in the same manner as in Example 1 except that the biaxially stretched polypropylene film thickness was set to 6.5 μm, and the casting drum temperature to 65° C. to obtain a biaxially stretched polypropylene film. The characteristics of the biaxially stretched polypropylene film obtained are shown in Tables 2 to 4.

Example 8

A film formation was carried out in the same manner as in Example 1 except that the biaxially stretched polypropylene film thickness was set to 6.0 μm, and the casting drum temperature to 75° C. to obtain a biaxially stretched polypropylene film. The characteristics of the biaxially stretched polypropylene film obtained are shown in Tables 2 to 4.

Example 9

A film formation was carried out in the same manner as in Example 1 except that the biaxially stretched polypropylene film thickness was set to 6.0 μm and the casting drum temperature to 75° C., and both of the surfaces A and B of the biaxially stretched polypropylene film were subjected to corona discharge treatment in the air at a treatment intensity of 20 W·min/m² to obtain a biaxially stretched polypropylene film. The characteristics of the biaxially stretched polypropylene film obtained are shown in Tables 2 to 4.

Example 10

A film formation was carried out in the same manner as in Example 1 except that the biaxially stretched polypropylene film thickness was set to 4.0 μm, the casting drum temperature was 85° C. and a temperature at which the sheet was guided to the tenter to be stretched 10-fold in the width direction was 160° C. to obtain a biaxially stretched polypropylene film. The characteristics of the biaxially stretched polypropylene film obtained are shown in Tables 2 to 4.

Example 11

A film formation was carried out in the same manner as in Example 1 except that the biaxially stretched polypropylene film thickness was set to 4.0 μm, the casting drum temperature was 90° C. and a temperature at which the sheet was guided to the tenter to be stretched 10-fold in the width direction was 160° C. to obtain a biaxially stretched polypropylene film. The characteristics of the biaxially stretched polypropylene film obtained are shown in Tables 2 to 4.

Example 12

A film formation was carried out in the same manner as in Example 1 except that the biaxially stretched polypropylene film thickness was set to 4.0 μm, the casting drum temperature was 80° C. and a temperature at which the sheet was guided to the tenter to be stretched 10-fold in the width direction was 160° C. to obtain a biaxially stretched polypropylene film. The characteristics of the biaxially stretched polypropylene film obtained are shown in Tables 2 to 4.

Example 13

A film formation was carried out in the same manner as in Example 1 except that the biaxially stretched polypropylene film thickness was set to 12.0 μm, the casting drum temperature was 70° C., a temperature at which the sheet was stretched 4.6-fold in the longitudinal direction was 140° C., the output power of the radiation heater was 13.5 kW and a temperature at which the sheet was guided to the tenter to be stretched 10-fold in the width direction was 170° C. to obtain a biaxially stretched polypropylene film. The characteristics of the biaxially stretched polypropylene film obtained are shown in Tables 2 to 4.

Example 14

A film formation was carried out in the same manner as in Example 1 except that the biaxially stretched polypropylene film thickness was set to 12.0 μm, the casting drum temperature was 75° C., a temperature at which the sheet was stretched 4.6-fold in the longitudinal direction was 140° C., the output power of the radiation heater was 13.5 kW and a temperature at which the sheet was guided to the tenter to be stretched 10-fold in the width direction was 170° C. to obtain a biaxially stretched polypropylene film. The characteristics of the biaxially stretched polypropylene film obtained are shown in Tables 2 to 4.

Example 15

A film formation was carried out in the same manner as in Example 1 except that the biaxially stretched polypropylene film thickness was set to 12.0 μm, the casting drum temperature was 75° C., a temperature at which the sheet was stretched 4.6-fold in the longitudinal direction was 140° C., the output power of the radiation heater was 5.0 kW and a temperature at which the sheet was guided to the tenter to be stretched 10-fold in the width direction was 170° C. to obtain a biaxially stretched polypropylene film. The characteristics of the biaxially stretched polypropylene film obtained are shown in Tables 2 to 4.

Example 16

A film formation was carried out in the same manner as in Example 1 except that the biaxially stretched polypropylene film thickness was set to 12.0 μm, the casting drum temperature was 80° C., a temperature at which the sheet was stretched 4.6-fold in the longitudinal direction was 140° C., and a temperature at which the sheet was guided to the tenter to be stretched 10-fold in the width direction was 170° C. to obtain a biaxially stretched polypropylene film. The characteristics of the biaxially stretched polypropylene film obtained are shown in Tables 2 to 4.

Example 17

A film formation was carried out in the same manner as in Example 1 except that the biaxially stretched polypropylene film thickness was set to 15.0 μm, the casting drum temperature was 70° C., a temperature at which the sheet was stretched 4.6-fold in the longitudinal direction was 140° C., the output power of the radiation heater was 13.5 kW and a temperature at which the sheet was guided to the tenter to be stretched 10-fold in the width direction was 170° C. to obtain a biaxially stretched polypropylene film. The characteristics of the biaxially stretched polypropylene film obtained are shown in Tables 2 to 4.

Example 18

A film formation was carried out in the same manner as in Example 1 except that the biaxially stretched polypropylene film thickness was set to 15.0 μm, the casting drum temperature was 75° C., a temperature at which the sheet was stretched 4.6-fold in the longitudinal direction was 140° C., the output power of the radiation heater was 13.5 kW and a temperature at which the sheet was guided to the tenter to be stretched 10-fold in the width direction was 170° C. to obtain a biaxially stretched polypropylene film. The characteristics of the biaxially stretched polypropylene film obtained are shown in Tables 2 to 4.

Example 19

A film formation was carried out in the same manner as in Example 1 except that the biaxially stretched polypropylene film thickness was set to 8.0 μm, the casting drum temperature was 70° C., a temperature at which the sheet was stretched 4.6-fold in the longitudinal direction was 140° C., and the output power of the radiation heater was 13.5 kW to obtain a biaxially stretched polypropylene film. The characteristics of the biaxially stretched polypropylene film obtained are shown in Tables 2 to 4.

Example 20

A film formation was carried out in the same manner as in Example 1 except that the biaxially stretched polypropylene film thickness was set to 8.0 μm, the casting drum temperature was 75° C., a temperature at which the sheet was stretched 4.6-fold in the longitudinal direction was 140° C., and the output power of the radiation heater was 13.5 kW to obtain a biaxially stretched polypropylene film. The characteristics of the biaxially stretched polypropylene film obtained are shown in Tables 2 to 4.

Example 21

A film formation was carried out in the same manner as in Example 1 except that the biaxially stretched polypropylene film thickness was set to 8.0 μm, the casting drum temperature was 65° C., a temperature at which the sheet was stretched 4.6-fold in the longitudinal direction was 140° C., and the output power of the radiation heater was 13.5 kW to obtain a biaxially stretched polypropylene film. The characteristics of the biaxially stretched polypropylene film obtained are shown in Tables 2 to 4.

Example 22

A film formation was carried out in the same manner as in Example 1 except that the casting drum temperature was set to 65° C. and the output power of the radiation heater to 13.5 kW to obtain a biaxially stretched polypropylene film. The characteristics of the biaxially stretched polypropylene film obtained are shown in Tables 2 to 4.

Comparative Example 1

A film formation was carried out in the same manner as in Example 1 except that no branched polypropylene resin was added to obtain a biaxially stretched polypropylene film. The characteristics of the biaxially stretched polypropylene film obtained are shown in Tables 2 to 4.

Comparative Example 2

A film formation was carried out in the same manner as in Example 1 except that the casting drum temperature was set to 85° C. to obtain a biaxially stretched polypropylene film. The characteristics of the biaxially stretched polypropylene film obtained are shown in Tables 2 to 4.

Comparative Example 3

A film formation was carried out in the same manner as in Example 1 except that the casting drum temperature was set to 55° C. to obtain a biaxially stretched polypropylene film. The characteristics of the biaxially stretched polypropylene film obtained are shown in Tables 2 to 4.

Comparative Example 4

A film formation was carried out in the same manner as in Example 1 except that the output power of the radiation heater was set to 3.5 kW to obtain a biaxially stretched polypropylene film. The characteristics of the biaxially stretched polypropylene film obtained are shown in Tables 2 to 4.

Comparative Example 5

A film formation was carried out in the same manner as in Example 1 except that the casting drum temperature was set to 80° C., the surface A preheating temperature before stretching to 125° C., the surface B preheating temperature before stretching to 135° C., a temperature at which the sheet was stretched 4.6-fold in the longitudinal direction to 140° C., and the output power of the radiation heater to 3.5 kW to obtain a biaxially stretched polypropylene film. The characteristics of the biaxially stretched polypropylene film obtained are shown in Tables 2 to 4.

Comparative Example 6

A film formation was carried out in the same manner as in Example 1 except that a temperature at which the sheet was stretched 4.6-fold in the longitudinal direction was set to 152° C. to obtain a biaxially stretched polypropylene film. The characteristics of the biaxially stretched polypropylene film obtained are shown in Tables 2 to 4.

Comparative Example 7

A film formation was carried out in the same manner as in Example 1 except that no branched polypropylene resin was added, and the surface A preheating temperature before stretching was set to 140° C. and the surface B preheating temperature before stretching to 130° C. to obtain a biaxially stretched polypropylene film. The characteristics of the biaxially stretched polypropylene film obtained are shown in Tables 2 to 4.

Comparative Example 8

A film formation was carried out in the same manner as in Example 8 except that, for the biaxially stretched polypropylene film of 6.0 μm in thickness, the casting drum temperature was set to 85° C. to obtain a biaxially stretched polypropylene film. The characteristics of the biaxially stretched polypropylene film obtained are shown in Tables 2 to 4.

Comparative Example 9

A film formation was carried out in the same manner as in Example 8 except that, for the biaxially stretched polypropylene film of 6.0 μm in thickness, the casting drum temperature was set to 55° C. to obtain a biaxially stretched polypropylene film. The characteristics of the biaxially stretched polypropylene film obtained are shown in Tables 2 to 4.

Comparative Example 10

A film formation was carried out in the same manner as in Example 10 except that, for the biaxially stretched polypropylene film of 4.0 μm in thickness, the casting drum temperature was set to 95° C. to obtain a biaxially stretched polypropylene film. The characteristics of the biaxially stretched polypropylene film obtained are shown in Tables 2 to 4.

Comparative Example 11

A film formation was carried out in the same manner as in Example 10 except that, for the biaxially stretched polypropylene film of 4.0 μm in thickness, the casting drum temperature was set to 75° C. to obtain a biaxially stretched polypropylene film. The characteristics of the biaxially stretched polypropylene film obtained are shown in Tables 2 to 4.

Comparative Example 12

A film formation was carried out in the same manner as in Example 1 except that the biaxially stretched polypropylene film thickness was set to 3.0 μm, the casting drum temperature to 90° C., the output power of the radiation heater to 3.5 kW and a temperature at which the sheet was stretched 10-fold in the width direction to 160° C. to obtain a biaxially stretched polypropylene film. The characteristics of the biaxially stretched polypropylene film obtained are shown in Tables 2 to 4.

Comparative Example 13

A film formation was carried out in the same manner as in Example 1 except that the biaxially stretched polypropylene film thickness was set to 3.0 μm, the casting drum temperature to 95° C., the output power of the radiation heater to 3.5 kW and a temperature at which the sheet was stretched 10-fold in the width direction to 160° C. to obtain a biaxially stretched polypropylene film. The characteristics of the biaxially stretched polypropylene film obtained are shown in Tables 2 to 4.

Comparative Example 14

A film formation was carried out in the same manner as in Example 1 except that the biaxially stretched polypropylene film thickness was set to 3.0 μm, the casting drum temperature to 90° C., the output power of the radiation heater to 10.5 kW and a temperature at which the sheet was stretched 10-fold in the width direction to 160° C. to obtain a biaxially stretched polypropylene film. The characteristics of the biaxially stretched polypropylene film obtained are shown in Tables 2 to 4.

Comparative Example 15

A film formation was carried out in the same manner as in Example 10 except that, for the biaxially stretched polypropylene film of 4.0 μm in thickness, the casting drum temperature was set to 90° C. and the output power of the radiation heater to 3.5 kW to obtain a biaxially stretched polypropylene film. The characteristics of the biaxially stretched polypropylene film obtained are shown in Tables 2 to 4.

Comparative Example 16

A film formation was carried out in the same manner as in Example 8 except that, for the biaxially stretched polypropylene film of 6.0 μm in thickness, the radiation heater output was set to 3.5 kW to obtain a biaxially stretched polypropylene film. The characteristics of the biaxially stretched polypropylene film obtained are shown in Tables 2 to 4.

Comparative Example 17

A film formation was carried out in the same manner as in Example 13 except that, for the biaxially stretched polypropylene film of 12.0 μm in thickness, the casting drum temperature was set to 60° C. to obtain a biaxially stretched polypropylene film. The characteristics of the biaxially stretched polypropylene film obtained are shown in Tables 2 to 4.

Comparative Example 18

A film formation was carried out in the same manner as in Example 14 except that, for the biaxially stretched polypropylene film of 12.0 μm in thickness, the output power of the radiation heater was set to 5.0 kW to obtain a biaxially stretched polypropylene film. The characteristics of the biaxially stretched polypropylene film obtained are shown in Tables 2 to 4.

TABLE 1

|  | A Surface | B Surface |
|---|---|---|
| SRa [nm] | 29.39 | 48.92 |
| SRz [nm] | 677.5 | 1130 |
| SRmax [nm] | 737.5 | 1225 |
| M-AREA [mm$^2$] | 0.249 | 0.249 |
| S-AREA [mm$^2$] | 0.1 | 0.1 |
| Z [nm] | COUNT | COUNT |
| 50 | 0.00000 | 0.00000 |
| 100 | 0.00000 | 0.00000 |
| 150 | 0.40160 | 0.00000 |
| 200 | 10.04010 | 0.00000 |
| 250 | 112.04800 | 0.00000 |
| 300 | 51.80710 | 1.60642 |
| 350 | 30.52200 | 20.08030 |
| 400 | 20.88350 | 126.50500 |
| 450 | 13.65460 | 134.13600 |
| 500 | 10.04010 | 103.21200 |
| 550 | 7.22890 | 84.73880 |
| 600 | 4.01606 | 70.68260 |
| 650 | 2.00803 | 60.64250 |
| 700 | 1.20481 | 44.97980 |
| 750 | 0.00000 | 34.53810 |
| 800 | 0.00000 | 25.30110 |
| 850 | 0.00000 | 14.85940 |
| 900 | 0.00000 | 10.44170 |
| 950 | 0.00000 | 5.62248 |
| 1000 | 0.00000 | 3.61445 |
| 1050 | 0.00000 | 3.21284 |
| 1100 | 0.00000 | 2.40963 |
| 1150 | 0.00000 | 1.60642 |
| 1200 | 0.00000 | 0.80321 |
| 1250 | 0.00000 | 0.00000 |
| 1300 | 0.00000 | 0.00000 |

TABLE 2

| | Thickness t1 (μm) | A Surface | | | | B Surface | | | |
|---|---|---|---|---|---|---|---|---|---|
| | | sRaA (nm) | SRzA (nm) | PAmin (nm) | PAmax (nm) | SRaB (nm) | SRzB (nm) | PBmin (nm) | PBmax (nm) |
| Example 1 | 7.0 | 23.2 | 578 | 150 | 750 | 44.4 | 1128 | 250 | 1300 |
| Example 2 | 7.0 | 24.6 | 828 | 200 | 950 | 48.3 | 1284 | 300 | 1400 |
| Example 3 | 7.0 | 21.3 | 411 | 100 | 600 | 39.9 | 1008 | 300 | 1150 |
| Example 4 | 7.0 | 24.8 | 594 | 150 | 800 | 35.8 | 816 | 250 | 1000 |
| Example 5 | 6.5 | 24.7 | 781 | 250 | 900 | 43.5 | 1201 | 300 | 1300 |
| Example 6 | 6.5 | 25.1 | 839 | 250 | 950 | 43.2 | 1235 | 200 | 1350 |
| Example 7 | 6.5 | 21.4 | 608 | 100 | 650 | 43.6 | 1195 | 250 | 1250 |
| Example 8 | 6.0 | 28.7 | 777 | 200 | 800 | 42.5 | 1160 | 250 | 1300 |
| Example 9 | 6.0 | 28.2 | 768 | 200 | 800 | 42.0 | 1114 | 250 | 1250 |
| Example 10 | 4.0 | 29.8 | 725 | 200 | 800 | 39.2 | 1068 | 200 | 1150 |
| Example 11 | 4.0 | 34.7 | 808 | 250 | 950 | 40.5 | 1100 | 200 | 1200 |
| Example 12 | 4.0 | 27.0 | 701 | 150 | 800 | 36.7 | 885 | 100 | 950 |
| Example 13 | 12.0 | 23.6 | 438 | 150 | 500 | 41.2 | 983 | 350 | 1200 |
| Example 14 | 12.0 | 26.5 | 540 | 100 | 600 | 43.8 | 1138 | 350 | 1350 |
| Example 15 | 12.0 | 23.5 | 447 | 200 | 500 | 39.5 | 835 | 300 | 1050 |
| Example 16 | 12.0 | 43.3 | 165 | 100 | 150 | 42.5 | 1152 | 350 | 1500 |
| Example 17 | 15.0 | 23.6 | 415 | 100 | 250 | 37.3 | 903 | 250 | 1050 |
| Example 18 | 15.0 | 25.4 | 480 | 150 | 550 | 39.9 | 1085 | 300 | 1250 |
| Example 19 | 8.0 | 22.1 | 603 | 150 | 700 | 39.6 | 1101 | 250 | 1250 |
| Example 20 | 8.0 | 24.0 | 817 | 200 | 950 | 42.2 | 1287 | 250 | 1450 |
| Example 21 | 8.0 | 20.2 | 420 | 150 | 650 | 36.5 | 977 | 150 | 1150 |
| Example 22 | 7.0 | 27.2 | 707 | 250 | 850 | 40.2 | 1090 | 300 | 1250 |
| Comparative Example 1 | 7.0 | 30.0 | 1100 | 150 | 1300 | 31.3 | 942 | 200 | 1050 |
| Comparative Example 2 | 7.0 | 31.0 | 798 | 300 | 1150 | 55.0 | 1988 | 350 | 2200 |
| Comparative Example 3 | 7.0 | 19.4 | 301 | 50 | 400 | 30.1 | 1135 | 250 | 1350 |
| Comparative Example 4 | 7.0 | 22.8 | 447 | 100 | 600 | 28.5 | 978 | 250 | 1100 |
| Comparative Example 5 | 7.0 | 25.1 | 455 | 100 | 650 | 30.7 | 582 | 150 | 850 |
| Comparative Example 6 | 7.0 | 28.2 | 832 | 200 | 900 | 45.7 | 1384 | 300 | 1500 |
| Comparative Example 7 | 7.0 | 43.0 | 1203 | 250 | 1550 | 24.2 | 801 | 150 | 850 |
| Comparative Example 8 | 6.0 | 29.7 | 809 | 300 | 950 | 44.3 | 1422 | 350 | 1700 |
| Comparative Example 9 | 6.0 | 20.2 | 405 | 50 | 550 | 30.8 | 851 | 200 | 1000 |
| Comparative Example 10 | 4.0 | 31.4 | 809 | 300 | 950 | 45.4 | 1356 | 300 | 1550 |
| Comparative Example 11 | 4.0 | 21.8 | 437 | 50 | 550 | 28.6 | 721 | 200 | 850 |
| Comparative Example 12 | 3.0 | 35.8 | 1088 | 250 | 1250 | 37.3 | 879 | 300 | 1150 |
| Comparative Example 13 | 3.0 | 43.2 | 1151 | 300 | 1350 | 41.2 | 1030 | 350 | 1300 |
| Comparative Example 14 | 3.0 | 40.7 | 1098 | 300 | 1300 | 38.4 | 981 | 300 | 1250 |
| Comparative Example 15 | 4.0 | 21.5 | 630 | 200 | 700 | 27.3 | 665 | 200 | 850 |
| Comparative Example 16 | 6.0 | 19.5 | 463 | 100 | 500 | 32.8 | 805 | 250 | 850 |
| Comparative Example 17 | 12.0 | 21.1 | 165 | 100 | 200 | 39.2 | 840 | 350 | 1100 |
| Comparative Example 18 | 12.0 | 20.4 | 237 | 100 | 200 | 37.9 | 744 | 250 | 1000 |

TABLE 3

| | Characteristics of film surface projection heights | | | |
|---|---|---|---|---|
| | SRzA/SRzB | PB' (number/0.1 mm$^2$) | PB450-750/PB | |PA-PB| (number/0.1 mm$^2$) |
| Example 1 | 0.51 | 338 | 0.65 | 330 |
| Example 2 | 0.64 | 445 | 0.65 | 239 |
| Example 3 | 0.41 | 288 | 0.69 | 238 |
| Example 4 | 0.73 | 211 | 0.63 | 221 |
| Example 5 | 0.65 | 312 | 0.46 | 218 |
| Example 6 | 0.68 | 398 | 0.61 | 208 |
| Example 7 | 0.51 | 275 | 0.54 | 334 |
| Example 8 | 0.67 | 347 | 0.59 | 220 |

TABLE 3-continued

| | Characteristics of film surface projection heights | | | |
|---|---|---|---|---|
| | SRzA/SRzB | PB' (number/ 0.1 mm²) | PB450-750/PB | \|PA-PB\| (number/ 0.1 mm²) |
| Example 9 | 0.69 | 363 | 0.61 | 211 |
| Example 10 | 0.68 | 277 | 0.59 | 217 |
| Example 11 | 0.73 | 349 | 0.56 | 239 |
| Example 12 | 0.79 | 259 | 0.48 | 205 |
| Example 13 | 0.45 | 313 | 0.60 | 409 |
| Example 14 | 0.47 | 362 | 0.65 | 444 |
| Example 15 | 0.54 | 289 | 0.62 | 335 |
| Example 16 | 0.14 | 407 | 0.69 | 435 |
| Example 17 | 0.46 | 261 | 0.64 | 375 |
| Example 18 | 0.44 | 298 | 0.68 | 399 |
| Example 19 | 0.55 | 307 | 0.53 | 254 |
| Example 20 | 0.63 | 368 | 0.67 | 327 |
| Example 21 | 0.43 | 283 | 0.43 | 220 |
| Example 22 | 0.65 | 263 | 0.58 | 173 |
| Comparative Example 1 | 1.17 | 327 | 0.24 | 331 |
| Comparative Example 2 | 0.40 | 478 | 0.31 | 156 |
| Comparative Example 3 | 0.27 | 216 | 0.37 | 215 |
| Comparative Example 4 | 0.46 | 296 | 0.74 | 223 |
| Comparative Example 5 | 0.78 | 285 | 0.57 | 188 |
| Comparative Example 6 | 0.60 | 366 | 0.54 | 289 |
| Comparative Example 7 | 1.50 | 304 | 0.20 | 131 |
| Comparative Example 8 | 0.57 | 422 | 0.35 | 285 |
| Comparative Example 9 | 0.48 | 197 | 0.29 | 201 |
| Comparative Example 10 | 0.60 | 319 | 0.38 | 246 |
| Comparative Example 11 | 0.61 | 222 | 0.45 | 144 |
| Comparative Example 12 | 1.24 | 402 | 0.65 | 58 |
| Comparative Example 13 | 1.12 | 530 | 0.85 | 101 |
| Comparative Example 14 | 1.12 | 651 | 0.48 | 134 |
| Comparative Example 15 | 0.95 | 217 | 0.32 | 153 |
| Comparative Example 16 | 0.58 | 273 | 0.38 | 180 |
| Comparative Example 17 | 0.15 | 175 | 0.77 | 257 |
| Comparative Example 18 | 0.32 | 265 | 0.59 | 299 |

TABLE 4

| | Original Film | | | Capacitor Characteristics | |
|---|---|---|---|---|---|
| | Withstand Voltage (V/μm) | Original slit yield | Element Winding Yield | AC Withstand Voltage (V/μm) | Preservability |
| Example 1 | 622 | A | A | 151 | A |
| Example 2 | 608 | A | A | 144 | B |
| Example 3 | 630 | A | A | 149 | B |
| Example 4 | 630 | A | B | 150 | B |
| Example 5 | 592 | A | A | 144 | A |
| Example 6 | 591 | A | A | 142 | B |
| Example 7 | 607 | A | A | 147 | A |
| Example 8 | 605 | A | A | 141 | A |
| Example 9 | 608 | A | A | 141 | A |
| Example 10 | 611 | A | A | 143 | A |
| Example 11 | 596 | A | A | 145 | A |
| Example 12 | 615 | A | A | 149 | B |
| Example 13 | 620 | A | A | 150 | A |
| Example 14 | 609 | A | A | 147 | A |
| Example 15 | 629 | A | A | 150 | B |
| Example 16 | 605 | A | A | 149 | A |
| Example 17 | 618 | A | A | 145 | A |
| Example 18 | 600 | A | A | 149 | A |
| Example 19 | 602 | A | A | 145 | A |
| Example 20 | 591 | A | A | 143 | B |
| Example 21 | 607 | A | A | 145 | A |
| Example 22 | 625 | A | B | 145 | B |
| Comparative Example 1 | 613 | B | A | 142 | B |
| Comparative Example 2 | 579 | A | B | 136 | C |
| Comparative Example 3 | 601 | B | B | 140 | C |
| Comparative Example 4 | 599 | A | B | 144 | B |
| Comparative Example 5 | 615 | A | B | 145 | C |
| Comparative Example 6 | 631 | B | C | 148 | C |
| Comparative Example 7 | 606 | B | B | 140 | C |
| Comparative Example 8 | 584 | A | B | 135 | B |
| Comparative Example 9 | 628 | B | C | 141 | C |
| Comparative Example 10 | 597 | A | B | 133 | C |
| Comparative Example 11 | 628 | B | C | 141 | C |
| Comparative Example 12 | 619 | A | B | 133 | C |
| Comparative Example 13 | 625 | B | A | 140 | C |
| Comparative Example 14 | 611 | B | B | 141 | C |
| Comparative Example 15 | 618 | B | B | 138 | C |
| Comparative Example 16 | 613 | B | B | 139 | C |
| Comparative Example 17 | 623 | B | B | 143 | C |
| Comparative Example 18 | 632 | B | C | 146 | C |

The invention claimed is:

1. A biaxially stretched polypropylene film comprising a branched polypropylene in a proportion of more than 0.05 to less than 3.0% by mass based on the mass of the film, with the remainder being linear polypropylene, the film having projections on both surfaces thereof, and a thickness t1 (μm) of 4 to 20 μm, wherein when one of both the surfaces that is smaller in SRz is represented by a surface A and the other surface is represented by a surface B, wherein:

$800 \leq SRzB \leq 1,300$ (nm), $0.63 \leq SRzA/SRzB \leq 0.73$, $222 \leq SRzB - SRzA \leq 470$ (nm), $PB' \geq 250$ (number/0.1-mm$^2$), $PA\min \geq 100$ (nm), $PA\max \leq 1,000$ (nm), $PB\min \geq 100$ (nm), $PB\max \leq 1,500$ (nm), $|PA - PB| \geq 200$, and $0.4 \leq PB450\text{-}750/PB \leq 0.7$, are satisfied and wherein:
- SRzA: a ten-point average roughness (nm) of the surface A,
- SRzB: a ten-point average roughness (nm) of the surface B,
- PA: the total number of projections present in the surface A per 0.1 mm$^2$ (number/0.1-mm$^2$),
- PAmin: a minimum projection height (nm) of the surface A,
- PAmax: a maximum projection height (nm) of the surface A,
- PBmin: a minimum projection height (nm) of the surface B,
- PBmax: a maximum projection height (nm) of the surface B,
- PB450-750: the number of projections which are present in the surface B and each have a height of 450 nm or more but less than 750 nm per 0.1 mm$^2$ (number/0.1-mm$^2$),
- PB: the total number of projections present in the surface B per 0.1 mm$^2$ (number/0.1-mm$^2$), and
- PB': the total sum (number/0.1-mm$^2$) of respective projection numbers counted at, out of measurement heights (slice values) measured at intervals of 50 nm from a height of 0 nm in the surface B by use of a non-contact three-dimensional microfigure measuring instrument, slice values larger than a slice value at which a maximum count value is obtained in the surface B.

2. The biaxially stretched polypropylene film according to claim 1, wherein:

$20 \leq SRaA \leq 40$ (nm), and $30 \leq SRaB \leq 50$ (nm), are satisfied and wherein:
- SRaA: a central-line average roughness (nm) of the surface A, and
- SRaB: a central-line average roughness (nm) of the surface B.

3. The biaxially stretched polypropylene film according to claim 1, wherein when a central-line average roughness (nm) of the surface A is represented by SRaA (nm) and that of the surface B by SRaB (nm), at least one of values of SRzA/SRaA and SRzB/SRaB is 20 to 35.

4. A metallized film comprising the biaxially stretched polypropylene film for a capacitor which is recited in claim 1, and a metal film deposited over at least one surface of the polypropylene film.

5. The metallized film according to claim 4, wherein a surface electrical resistance of the metal film is 1 to 20Ω/□.

6. A film capacitor comprising the metallized film recited in claim 4.

7. A film capacitor comprising the metallized film recited in claim 5.

* * * * *